United States Patent
McClean

(10) Patent No.: US 11,915,103 B2
(45) Date of Patent: Feb. 27, 2024

(54) QUANTUM DATA PROCESSING SYSTEM

(71) Applicant: Google LLC, Mountain View, CA (US)

(72) Inventor: Jarrod Ryan McClean, Marina Del Rey, CA (US)

(73) Assignee: Google LLC, Mountain View, CA (US)

(*) Notice: Subject to any disclaimer, the term of this patent is extended or adjusted under 35 U.S.C. 154(b) by 113 days.

(21) Appl. No.: 17/731,016

(22) Filed: Apr. 27, 2022

(65) Prior Publication Data
US 2022/0358394 A1    Nov. 10, 2022

Related U.S. Application Data

(60) Provisional application No. 63/180,445, filed on Apr. 27, 2021.

(51) Int. Cl.
*G06N 10/70* (2022.01)
*G06N 10/20* (2022.01)
*G06N 20/00* (2019.01)

(52) U.S. Cl.
CPC ............ *G06N 10/70* (2022.01); *G06N 10/20* (2022.01); *G06N 20/00* (2019.01)

(58) Field of Classification Search
CPC .................................. G06N 10/70; G06N 10/20
See application file for complete search history.

(56) References Cited

FOREIGN PATENT DOCUMENTS

JP    2020029386 A    * 2/2020    ............... H01Q 3/32

OTHER PUBLICATIONS

Khabat Heshami, Duncan G. England, Peter C. Humphreys, Philip J. Bustard, Victor M. Acosta, Joshua Nunn & Benjamin J. Sussman; Quantum memories: emerging applications and recent advances; Journal of Modern Optics, 2016 vol. 63, No. 20, 2005-2028 (Year: 2016).*

Sebastian Zaiser, Torsten Rendler, Ingmar Jakobi, Thomas Wolf, Sang-Yun Lee, Samuel Wagner, Ville Bergholm, Thomas Schulte-Herbruggen, Philipp Neumann & Jorg Wrachtrup; Enhancing quantum sensing sensitivity by a quantum memory; m Nature Communications; Published Aug. 10, 2016 (Year: 2016).*

Aharonov et al., "Quantum Algorithmic Measurement," submitted on Jul. 21, 2021, arXiv:2101.04634v2, 96 pages.

(Continued)

*Primary Examiner* — Joseph D Torres
(74) *Attorney, Agent, or Firm* — Fish & Richardson P.C.

(57) ABSTRACT

Methods, systems, and apparatus for quantum data processing. In one aspect, a method includes storing, in a quantum memory, multiple copies of a quantum state, comprising, for each copy of the quantum state, i) probing, by an initialized quantum sensor, a target system to obtain an evolved quantum state of the quantum sensor, ii) transducing the evolved quantum state of the quantum sensor into a quantum state of a quantum buffer, iii) logically encoding the quantum state of the quantum buffer into a quantum error correcting code, and iv) moving the logically encoded quantum state of the quantum buffer into the quantum memory; loading the multiple copies of the quantum state in the quantum memory into a quantum computer; processing, by the quantum computer, the multiple copies of the quantum state to obtain a purified quantum state; and measuring the purified quantum state to determine properties of the target system.

28 Claims, 7 Drawing Sheets

(56) References Cited

OTHER PUBLICATIONS

Bartholomew et al., "On-chip coherent microwave-to-optical transduction mediated by ytterbium in YVO4." Nature communications 11.1, Jun. 2020, 3266: 6 pages.
Biamonte et al., "Quantum machine learning," submitted on May 10, 2018, arXiv:1611.09347V2, 24 pages.
Broughton et al., "TensorFlow Quantum: A Software Framework for Quantum Machine Learning" submitted on Mar. 6, 2020, arXiv:2003.02989V1, 39 pages.
DeVience et al., "Nanoscale NMR spectroscopy and imaging of multiple nuclear species." *Nature nanotechnology* 10.2, Feb. 2015, 129-134.
Huang et al., "Information-theoretic bounds on quantum advantage in machine learning," submitted on Apr. 2, 2021, arXiv2101.02464V2, 34 pages.
Huang et al., "Quantum advantage in learning from experiments," submitted on Dec. 1, 2021, arXiv:2112.00778V1, 52 pages.
Huggins et al., "Virtual distillation for quantum error mitigation," submitted on Aug. 2, 2021, arXiv:2011.07064v3, 26 pages.
International Search Report and Written Opinion in International Appln. No. PCT/US2022/026340, dated Sep. 20, 2022, 15 pages.
Leawoods et al., "Hyperpolarized 3He gas production and MR imaging of the lung." Concepts in Magnetic Resonance: An Educational Journal 13.5, 2001, 277-293.
Lloyd et al., "Quantum principal component analysis," Nature Physics, Sep. 2014, 10(9):631-633.
McClean et al., "What the foundations of quantum computer science teach us about chemistry" submitted on Jun. 7, 2021, arXiv:2106.03997v1, 13 pages.

\* cited by examiner

QUANTUM DATA PROCESSING SYSTEM

CROSS-REFERENCE TO RELATED APPLICATIONS

This application claims the benefit under 35 U.S.C. § 119(e) of U.S. patent application No. 63/180,445, entitled "QUANTUM DATA PROCESSING SYSTEM," filed Apr. 27, 2021. The disclosure of the foregoing application is incorporated herein by reference in its entirety for all purposes.

BACKGROUND

This specification relates to quantum sensing and quantum computing.

A quantum sensor is a quantum device that uses the sensitivity of a quantum system to external disturbances to measure physical quantities or parameters, including magnetic or electric fields, time, frequencies, rotations, temperatures or pressure. The quantum device is characterized by quantized energy levels and can include electronic, magnetic or vibrational states of superconducting or spin qubits, neutral atoms, or trapped ions. In a conventional quantum sensing protocol, the quantum sensor is initialized and interacts with a signal of interest. A quantum state of the quantum sensor is then transduced and/or readout. Phase estimation or parameter estimation techniques are applied on readout data obtained from a series of such readouts to reconstruct a physical quantity of interest.

SUMMARY

This specification describes a quantum data processing system.

In general, one innovative aspect of the subject matter described in this specification can be implemented in a method that includes storing, in a quantum memory, multiple copies of a quantum state, comprising, for each copy of the quantum state, i) probing, by an initialized quantum sensor, a target system to obtain an evolved quantum state of the quantum sensor, ii) transducing the evolved quantum state of the quantum sensor into a quantum state of a quantum buffer, iii) logically encoding the quantum state of the quantum buffer into a quantum error correcting code, and iv) moving the logically encoded quantum state of the quantum buffer into the quantum memory; loading the multiple copies of the quantum state in the quantum memory into a quantum computer; processing, by the quantum computer, the multiple copies of the quantum state to obtain a purified quantum state; and measuring the purified quantum state to determine properties of the target system.

Other implementations of these aspects include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the quantum sensor is configured to maintain quantum coherence.

In some implementations the evolved quantum state of the quantum sensor encodes properties of the target system at the time of the probing.

In some implementations the evolved quantum state of the quantum sensor comprises a state of multiple qubits or a state of bosonic or photonic modes.

In some implementations probing the target system to obtain the evolved quantum state of the quantum sensor is performed with finite signal to noise ratio.

In some implementations the quantum sensor is configured to implement full or partial quantum error correction on the evolved quantum state of the quantum sensor.

In some implementations the quantum sensor comprises a first computational medium and the quantum buffer comprises a second computational medium, wherein the second computational medium is different to the first computational medium.

In some implementations logically encoding the quantum state of the quantum buffer into a quantum error correcting code comprises applying a unitary encoding quantum circuit to the quantum state of the quantum buffer or performing a state injection technique.

In some implementations the quantum error correcting code comprises a code distance that is dependent on at least one of: operations performed by the quantum computer to obtain the purified quantum state or an expected duration required to store the multiple copies of the quantum state.

In some implementations the quantum error correcting code is the quantum buffer.

In some implementations processing the multiple copies of the quantum state to obtain a purified quantum state comprises performing a linear distillation technique to purify the multiple copies of the quantum state.

In some implementations the linear distillation technique comprises quantum state distillation, virtual state distillation or a quantum principle component analysis algorithm.

In some implementations measuring the purified quantum state to determine properties of the target system comprises providing measurement results to a quantum machine learning system to learn the properties of the target system.

In some implementations the target system comprises a transient target system.

The subject matter described in this specification can be implemented in particular ways so as to realize one or more of the following advantages.

In conventional quantum data processing, quantum sensors interface with classical systems. This forces the early use of measurement, which destroys the quantum information. Subsequent data purification/extraction or processing steps are therefore exponentially costly in the number of copies.

To reduce these costs, the presently described quantum data processing system includes quantum sensors that interface with quantum devices. The quantum devices implement quantum transduction and quantum storage techniques over multiple data collection repetitions to exceed the capabilities of quantum sensors that are only coupled to a classical computer. In particular, the presently described quantum data processing system achieves an exponential advantage in the number of times a measurement must be taken based on the size of the quantum sensor. This exponential advantage can also be realized even when the quantum memory and quantum processor are both noisy. The presently described techniques are therefore particularly suitable for implementations that use near term quantum computing devices, e.g., noisy intermediate-scale quantum (NISQ) devices.

In addition, compared to conventional quantum data processing systems, the presently described quantum data processing system can achieve increased sensitivity and an improved ability to de-noise signals coming from quantum sensors.

In addition, unlike conventional quantum data processing systems, the presently described quantum data processing system can collect and process quantum data in transient sensing applications where only limited data collection time may be available.

In addition, the presently described quantum data processing system is modular and different components can be changed or upgraded as needed to fit the needs of particular applications.

In addition, the presently described quantum data processing system can be used in various applications, e.g., to achieve improved chemical identification, improved quantum material characterization, and more precise sensing for imaging applications including medical imaging applications such as MRI.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes quantum data processing methods and systems for collecting and processing quantum data with an exponential speedup over classical processing for the same data. A data collection step is performed a fixed number of times or continuously. During the data collection step a quantum sensor probes a target system and collects data from the target system. The data is transferred into a quantum buffer that is compatible with logical encoding and is encoded into a quantum error correcting code. The encoded data is then shuttled into quantum memory. Once a sufficient number of copies of the data are collected in quantum memory, the quantum memory is loaded into a quantum computer. The quantum computer performs quantum data processing to purify or further refine the data. The refined data can then be used to measure and extract information about the target system, which can be fed to a classical computer or experimenter for further analysis.

Figure 1:
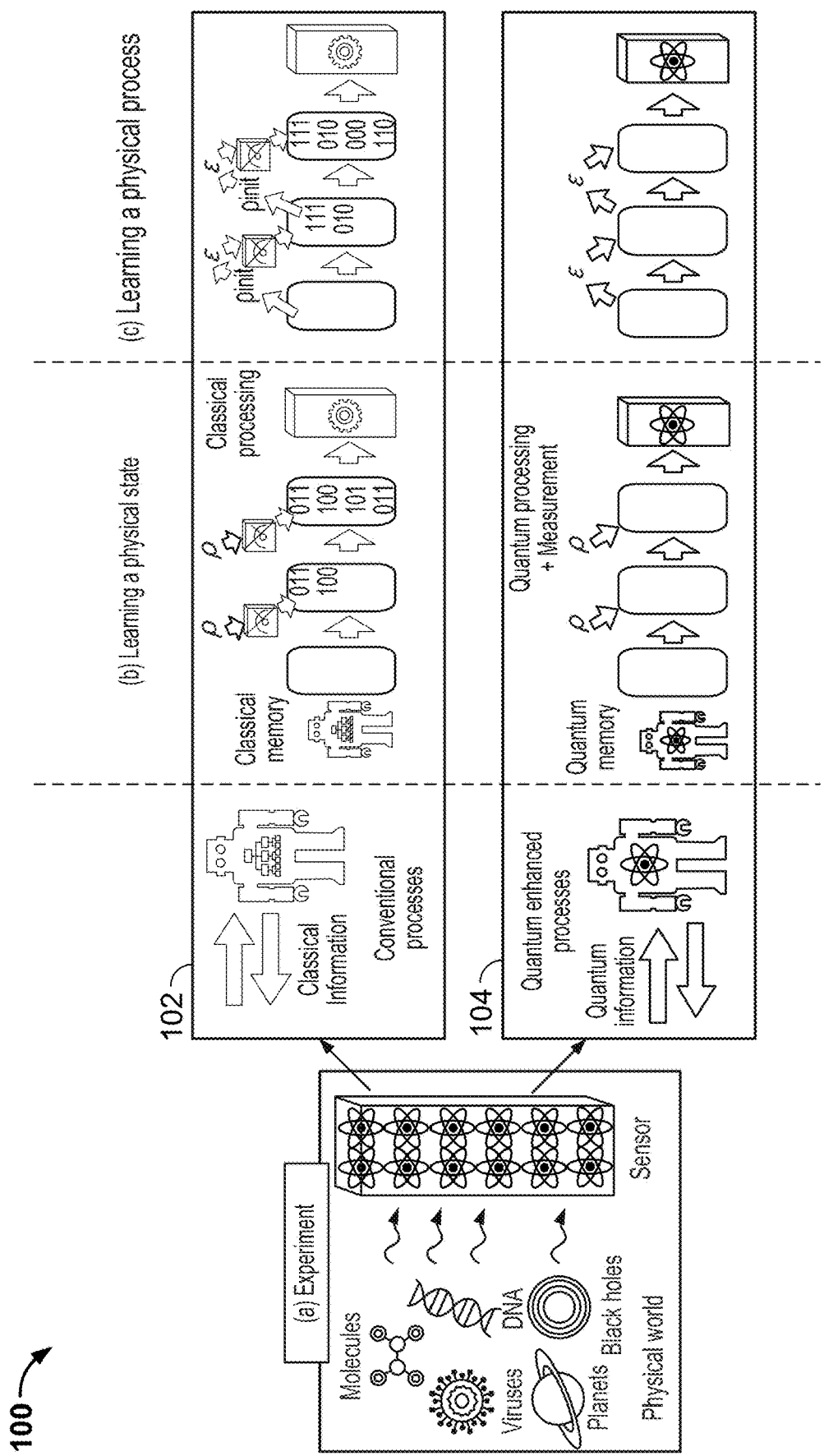
FIG. 1 is an illustration that compares conventional processes for collecting and processing quantum data to the presently described quantum-enhanced process for collecting and processing quantum data.

FIG. 1 is an illustration 100 that compares conventional processes 102 for collecting and processing quantum data to the presently described quantum-enhanced processes 104 for collecting and processing quantum data. In the conventional processes 102, the quantum sensors interface with a classical machine running classical algorithms. The classical machine can store and process classical information. In the quantum-enhanced processes 104, the quantum sensors interface with a quantum machine running quantum algorithms. The quantum machine can store and process quantum information.

At stage (a), experiments are performed. Each experiment includes probing a target physical system using quantum sensors, as described in more detail below with reference to FIG. 2. The target physical system can be a real-world system of interest, e.g., a molecule, virus, DNA, planet or black hole.

In some implementations each experiment produces a physical quantum state $\rho$. In these implementations, the goal of data processing is to learn some property of $\rho$, as shown in stage (b). In the conventional processes 102, multiple copies of $\rho$ are measured separately to obtain classical measurement data. The classical measurement data is stored in a classical memory. A classical computer processes the classical measurement data to output a prediction for the property of $\rho$. In the quantum-enhanced processes 104, the quantum state $\rho$ can coherently alter the quantum information stored in the memory of the quantum machine. Copies of $\rho$ are stored in a quantum memory as quantum data. The quantum memory is a memory that stores quantum states that may in general be in a superposition; by contrast, a classical memory only stores states as binary states. The quantum machine processes the quantum data and performs a measurement on the quantum memory to output a prediction for the property of $\rho$. It can be shown that for some tasks, the number of experiments needed to learn a target property of $\rho$ is exponential in n using conventional processes 102, but only polynomial in n using quantum-enhanced processes 104. For suitably defined tasks, an exponential quantum advantage can be achieved using a protocol as simple as storing two copies of $\rho$ in quantum memory and performing an entangling measurement.

In other implementations each experiment is an evolution of a quantum state under a physical process $\mathcal{E}$. In these implementations, the goal of data processing is to learn some property of the physical process $\mathcal{E}$, as shown in stage (c). In the conventional processes 102, the classical machine specifies the input state to $\mathcal{E}$ using a classical bitstring and obtains classical measurement data. In the quantum-enhanced processes 104, the evolution $\mathcal{E}$ coherently alters the memory of the quantum machine—the input state to $\mathcal{E}$ is entangled with the quantum memory in the quantum machine and the output state is retrieved coherently by the quantum machine. In these implementations the quantum-enhanced processes 104 achieve a similar exponential advantage.

Example Operating Environment

Figure 2:
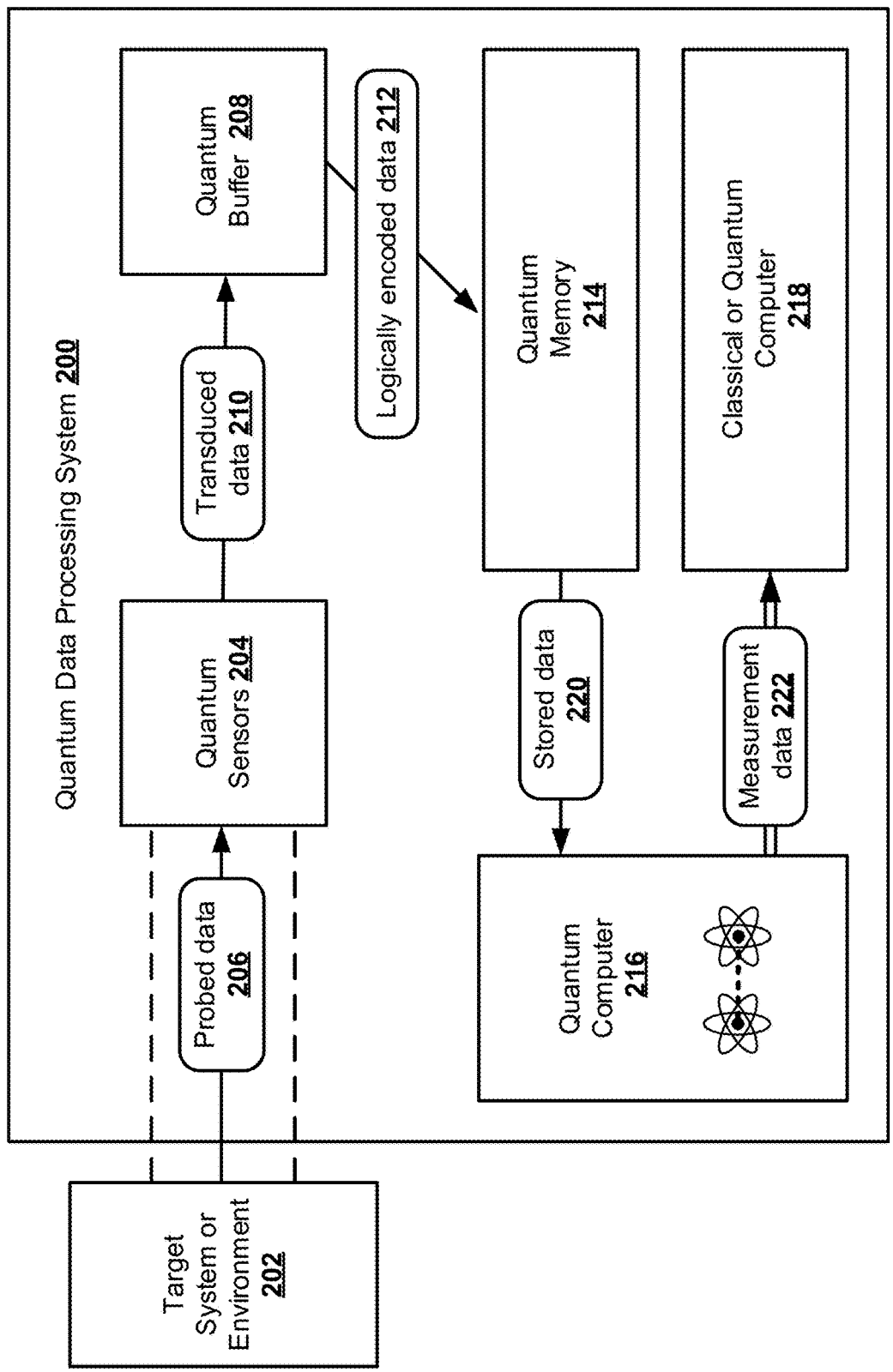
FIG. 2 is a block diagram of an example quantum data processing system.

FIG. 2 is a block diagram of an example quantum data processing system 200 for performing the presently described quantum-enhanced data processing techniques. The example quantum data processing system 200 is an example of a system implemented as classical and quantum computer programs on one or more classical computers and quantum computing devices in one or more locations, in which the systems, components, and techniques described herein can be implemented.

The example quantum data processing system 200 includes one or more quantum sensors, e.g., quantum sensor 204, a quantum buffer 208, quantum memory 214, quantum computer 216 and a classical or quantum computer 218. The quantum sensors are quantum devices that are configured to probe respective target systems, e.g., target system 202, and collect data 206 from the target systems. The target system 202 is a system of interest, e.g., a system from which physical quantities or parameters are to be estimated, and can vary based on the quantum data processing task being performed by the system 200. The target system 202 and the physical quantities or parameters can be quantum or classical. For example, data collected by the quantum sensor 204 could be produced by a classical process. In these cases by implementing the techniques described in this specification, properties of such a classical process can be determined exponentially faster—even though the source data is classical. Example target systems are described in more detail below with reference to FIG. 4.

To probe the target system 202, a quantum sensor 204 interacts with the target system 202 and the quantum state of a quantum system included in the quantum sensor 204 (hereafter referred to as a quantum state of the quantum sensor 204) evolves for a predetermined sensing time. During the evolution, the state of the quantum sensor 204 becomes dependent on the physical quantity or parameter of interest and reflects the state of the target system 202. In this manner, the quantum sensor 204 collects data 206 from the target system 202, where the data 206 is the evolved quantum state of the quantum sensor 204. In some implementations the data 206 can be collected with finite signal to noise ratio. In some implementations the quantum sensor 204 can implement full or partial quantum error correction to improve its sensing or data retention capabilities. In some implementations the quantum sensor 204 can maintain quantum coherence.

The type of quantum sensor 204 included in the quantum data processing system 200 is dependent on the target system 202 and the physical quantities or parameters of interest. For example, in magnetometry, electrometry, thermometry and chemical sensing applications the quantum sensor 204 can be a solid-state quantum sensor that includes nitrogen vacancies in a diamond (either isolated or distributed in a network). Other example quantum sensors include hyper-polarized spins in gases, nuclear spins of chemical specials in a solution, or cavity modes used to sense photonic states or detect exotic particles.

As a specific example, in some implementations the target system 202 can be an unknown metabolite and the physical quantities/properties can be the unknown metabolite's structure. In this example the structure of the unknown metabolite can be determined through signatures related to spin magnetization, electronic or vibrational excitation, or charge transport and the quantum sensors can include hyperpolarized gases compatible with spin transport, nitrogen vacancies in diamonds with enough for spatial resolution, or nanomechanical sensors for vibrational measurements.

As another example, in some implementations the target system can be some system for which a density profile of an unknown interior of the system is to be determined, e.g., imaging inside a cavern, container, or building. In this example the physical quantities to be determined can include an amount, distribution, and type of matter as well as material properties such as density or rigidity, and the quantum sensors can include quantum sensors sensitive to gravitational effects, e.g., advanced atom interferometers or atomic fountains that use quantum effects to sense gravity between the different spatial locations of the atoms. The quantum data processing system can increase the sensitivity and capabilities of these sensors.

In some implementations the system can include multiple quantum sensors that probe the target system 202 in parallel. Probing the target system 202 in parallel using multiple quantum sensors can decrease the amount of time that the state is kept in memory and increase the sampling rate, particularly in cases where sensing is being performed on multiple copies of a same target system, e.g., many copies of a molecule. Alternatively or in addition, the multiple quantum sensors can include different types of quantum sensors. Collecting complementary data from different types of sensors, e.g., in parallel, can increase the power of the quantum data processing system, e.g., enable the system to extract more accurate and insightful information and therefore compute improved estimations of physical properties and parameters, and is made possible by the structure and workflow of the quantum data processing system.

In conventional quantum data processing systems, i.e., systems different to the quantum data processing system described in this specification, after the quantum state of the quantum sensor 204 evolves for the predetermined sensing time and collects data 206 from the target system, the evolved quantum state of the quantum sensor 204 would be measured. The target system 202 would be repeatedly probed by the quantum sensor 204 during a total available measurement time and an estimate of the physical quantity or parameter of interest would be inferred via classical computation from accumulated measurement data. Accordingly, quantum information is destroyed early in the process, making subsequent data purification/extraction or data processing exponentially costly in the number of probes.

To avoid these costs, the quantum data processing system 200 transfers the data 206 collected by the quantum sensor 204 to the quantum buffer 208. The quantum buffer 208 is a quantum computing device that is configured to logically encode quantum information. For example, the quantum buffer 208 can be a superconducting computer that includes superconducting qubits, an ion trap quantum computer or a quantum computer that includes photonic qubits in a cluster state.

Since the quantum sensor 204 and quantum buffer 208 can be different quantum devices that include different quantum media, the devices can operate at different energy scales. For example, in some implementations the quantum sensor 204 can provide data as a state in a bosonic cavity mode whereas the quantum buffer 208 can include superconducting qubits. Therefore, to transfer the data 206, the quantum data processing system 200 is configured to perform quantum transduction on the data 206 collected by the quantum sensor 204 to convert the data 206 to transduced data 210 in a suitable form.

The particular transduction performed by the quantum data processing system 200 is dependent on the type of quantum sensor 204 and quantum buffer 208 included in the quantum data processing system 200 and can vary. For example, the quantum data processing system 200 can perform microwave to optical transduction to transform the data from an optical photon state of the quantum sensor 204 to a superconducting quantum state of the quantum buffer 208. As another example the quantum data processing system 200 can perform optical to ion transduction for an ion trap quantum buffer, cavity mode to superconducting qubit transduction for a superconducting quantum buffer, or cavity mode to photonic qubit transduction for a quantum buffer that includes photonic qubits in cluster states. In some implementations the transduction can be performed with limited fidelity.

In some implementations the quantum data processing system 200 logically encodes the transduced data 210 in the quantum buffer 208 into a quantum error correcting code to generate logically encoded data 212. Logically encoding the transduced data 210 accommodates storage of multiple copies of probed data and subsequent computation on the probed data. In some implementations the quantum data processing system 200 can logically encode the transduced data 210 through application of a unitary encoding circuit or a state injection technique. In these implementations the logical encoding can have a fidelity that is limited by the computational operations performed to apply the unitary encoding circuit or state injection technique.

The quantum memory 214 is configured to store logically encoded data 212 obtained from the quantum buffer 208. In some implementations, e.g. where computational resources are limited, the quantum error correcting code can be the quantum buffer itself. Example logical encodings and quantum storage systems that can be implemented by the quantum data processing system 200 include unitary encoding into the surface code, state injection into the surface code, encoding or injection into quantum LDPC codes directly, injection into a surface code followed by injection into an LDPC or higher rate code, or direct transfer from a logical sensor into a logical code state. The quantum memory may, for example, be an optical quantum memory, such as a cavity-based quantum memory or media-based quantum memory (e.g. atomic-, ionic- or molecular-based memories). It will be appreciated that many examples of quantum memory may alternatively be used.

In some implementations the distance of the code used by the quantum data processing system can be determined by subsequent computations to be performed on the data, e.g., by the quantum computer 216 as described below, and/or an expected wait time required to store a sufficient number of state copies in the quantum memory 214. For example, the code distance can be determined by the wait time to receive copies of the quantum state for a given protocol in addition to the computational time required, e.g., if 10 copies of the quantum state are required and it is expected that a computation takes a certain amount of time, the physical error rate in the device along with the threshold in the code can be used to calculate a required code distance from these factors to safely ensure that information does not decay inside the computer on that timescale and with those operations. In some implementations the code distance d can scale as d ~log(expected wait time+computation time).

The quantum memory 214 is configured to store logically encoded data 212 obtained from the quantum buffer 208. For example, as described in more detail below with reference to FIG. 3, the quantum data processing system 200 can repeatedly probe the target system 202 to collect multiple copies of the evolved quantum state of the quantum sensor 204 (in this specification a copy of the evolved quantum state is understood to mean a quantum state obtained after the quantum sensor 104 is reset and/or initialized and interacts with the target system 102 for the predetermined sensing time to obtain an evolved quantum state of the quantum sensor.) Each copy can be transduced and logically encoded before being stored in the quantum memory 214.

Once a predetermined number of copies of the evolved quantum state of the quantum sensor 204 is stored in the quantum memory 214, the stored data 220 can be loaded into the quantum computer 216 for processing. The predetermined number of copies is dependent on the operations to be performed on the data by the quantum computer 216 and can vary.

The quantum computer 216 is configured to process the data received from the quantum memory 214, e.g., through application of quantum algorithms. In some implementations the quantum computer 216 can purify the data received from the quantum memory 214. For example, the quantum computer can perform quantum data extraction on the data using linear distillation technique, e.g., quantum state distillation, virtual state distillation, or a quantum principle component analysis method (qPCA). The data extraction step achieves an exponential advantage over classical methods in the number of copies that needed to be recorded to perform this extraction. An example quantum computer 314 for processing data received from the quantum memory 214 is described below with reference to FIG. 3.

The quantum data processing system 200 can perform measurements on the extracted quantum data to obtain measurement data 222 and extract relevant information. The measurement data 222 can be provided to the classical or quantum computer 216 for further analysis, e.g., to estimate the physical quantities or parameters of interest. In some implementations the extracted information can be provided as input to a quantum machine learning system included in the classical or quantum computer 218 to learn properties about the data. In FIG. 2 the classical or quantum computer 216 is shown as a separate device to the quantum computer 216, however in some implementations the system 200 can include one computing device configured to perform the operations described above with reference to quantum computer 216 and classical or quantum computer 218.

In some implementations the quantum data processing system 100 can be included in or applied to a communication or quantum internet setting. For example, the quantum data processing system 200 can operate on data received from a quantum internet, quantum network, or quantum repeater along a quantum network. In these implementations, quantum communication protocols can also be included. In these settings the quantum data processing system 200 can be used to recover from errors with additional effectiveness beyond the code distance of original messages.

Figure 3:
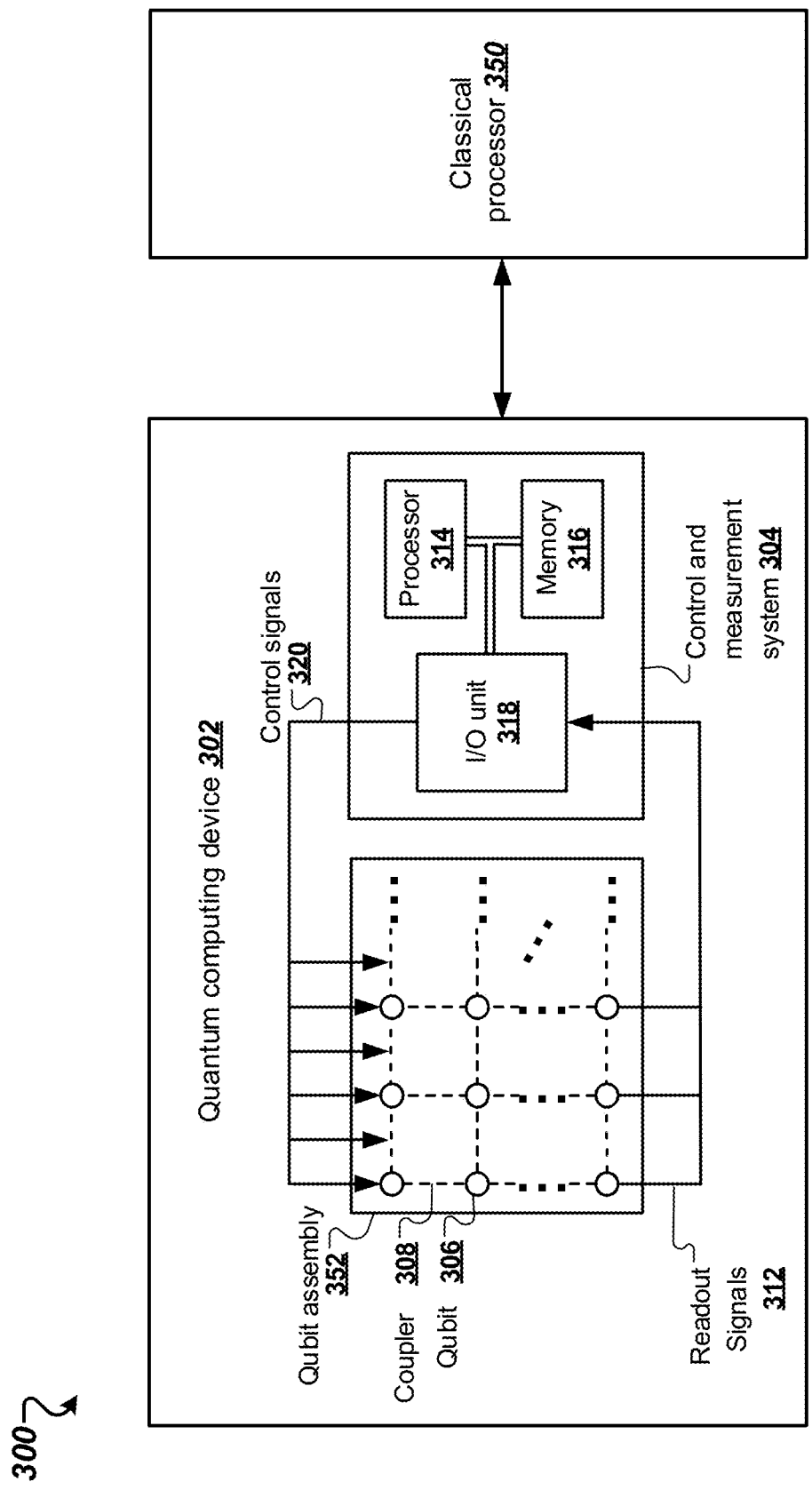
FIG. 3 is a diagram of an example quantum computing device.

FIG. 3 depicts an example classical/quantum computer 300 for performing some or all of the classical and quantum operations described in this specification, e.g., the operations described above with reference to quantum computer 216 and classical or quantum computer 218. The example classical/quantum computer 300 includes an example quantum computing device 302. The quantum computing device 302 is intended to represent various forms of quantum computing devices. The components shown here, their connections and relationships, and their functions, are exemplary only, and do not limit implementations of the inventions described and/or claimed in this document.

The example quantum computing device 302 includes a qubit assembly 352 and a control and measurement system 304. The qubit assembly includes multiple qubits, e.g., qubit 306, that are used to perform algorithmic operations or quantum computations. While the qubits shown in FIG. 3 are arranged in a rectangular array, this is a schematic depiction and is not intended to be limiting. The qubit assembly 352 also includes adjustable coupling elements, e.g., coupler 308, that allow for interactions between coupled qubits. In the schematic depiction of FIG. 3, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device 302 included in the example computer 300 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by loading qubits, e.g., from a quantum memory, and applying a sequence of unitary operators to the qubits. Applying a unitary operator to the qubits can include applying a corresponding sequence of quantum logic gates to the qubits, e.g., to implement a quantum algorithm such as a quantum principle component algorithm. Example quantum logic gates include single-qubit gates, e.g., Pauli-X, Pauli-Y, Pauli-Z (also referred to as X, Y, Z), Hadamard gates, S gates, rotations, two-qubit gates, e.g., controlled-X, controlled-Y, controlled-Z (also referred to as CX, CY, CZ), controlled NOT gates (also referred to as CNOT) controlled swap gates (also referred to as CSWAP), and gates involving three or more qubits, e.g., Toffoli gates. The quantum logic gates can be implemented by applying control signals 310 generated by the control and measurement system 304 to the qubits and to the couplers.

For example, in some implementations the qubits in the qubit assembly 352 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 310 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 310. The measurements cause readout signals 312 representing measurement results to be communicated back to the measurement and control system 304. The readout signals 312 may include RF, microwave, or optical signals depending on the physical scheme for the quantum computing device and/or the qubits. For convenience, the control signals 310 and readout signals 312 shown in FIG. 3 are depicted as addressing only selected elements of the qubit assembly (i.e. the top and bottom rows), but during operation the control signals 310 and readout signals 312 can address each element in the qubit assembly 352.

The control and measurement system 304 is an example of a classical computer system that can be used to perform various operations on the qubit assembly 352, as described above, as well as other classical subroutines or computations. The control and measurement system 304 includes one or more classical processors, e.g., classical processor 314, one or more memories, e.g., memory 316, and one or more I/O units, e.g., I/O unit 318, connected by one or more data buses. The control and measurement system 304 can be programmed to send sequences of control signals 310 to the qubit assembly, e.g. to carry out a selected series of quantum gate operations, and to receive sequences of readout signals 312 from the qubit assembly, e.g. as part of performing measurement operations.

The processor 314 is configured to process instructions for execution within the control and measurement system 304. In some implementations, the processor 314 is a single-threaded processor. In other implementations, the processor 314 is a multi-threaded processor. The processor 314 is capable of processing instructions stored in the memory 316.

The memory 316 stores information within the control and measurement system 304. In some implementations, the memory 316 includes a computer-readable medium, a volatile memory unit, and/or a non-volatile memory unit. In some cases, the memory 316 can include storage devices capable of providing mass storage for the system 304, e.g. a hard disk device, an optical disk device, a storage device that is shared over a network by multiple computing devices (e.g., a cloud storage device), and/or some other large capacity storage device.

The input/output device 318 provides input/output operations for the control and measurement system 304. The input/output device 318 can include D/A converters, A/D converters, and RF/microwave/optical signal generators, transmitters, and receivers, whereby to send control signals 310 to and receive readout signals 312 from the qubit assembly, as appropriate for the physical scheme for the quantum computer. In some implementations, the input/output device 318 can also include one or more network interface devices, e.g., an Ethernet card, a serial communication device, e.g., an RS-232 port, and/or a wireless interface device, e.g., an 802.11 card. In some implementations, the input/output device 318 can include driver devices configured to receive input data and send output data to other external devices, e.g., keyboard, printer and display devices.

Although an example control and measurement system 304 has been depicted in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The example system 300 also includes an example classical processor 350. The classical processor 350 can be used to perform classical computation operations described in this specification according to some implementations, e.g., the classical machine learning methods described herein.

Example Processes for Processing Quantum Data

Figure 4:
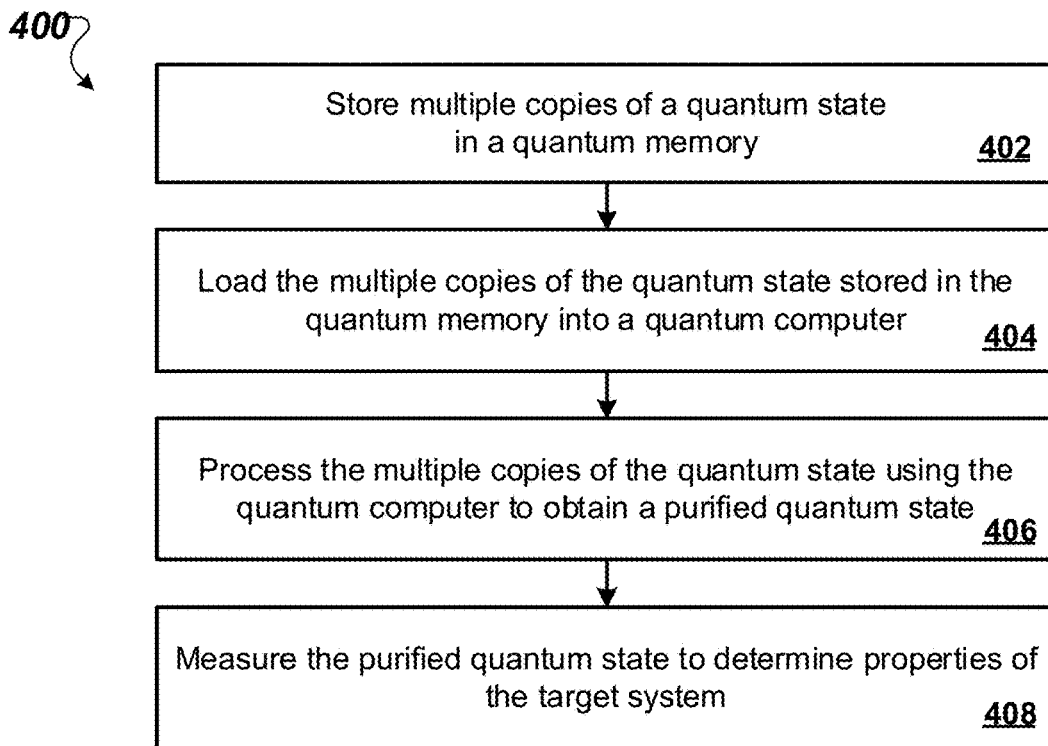
FIG. 4 is a flow chart of an example process for processing quantum data.

FIG. 4 is a flow diagram of an example process 400 for processing quantum data. For convenience, the process 400 will be described as being performed by a quantum data processing system. For example, the quantum data processing system 200 of FIG. 2, appropriately programmed in accordance with this specification, can perform the process 400.

The system stores multiple copies of a quantum state in a quantum memory (step 402). The quantum state can encode properties of a corresponding target system or target process, as described in more detail below. In some implementations the copies of the quantum state can be generated using quantum sensors, e.g., sensors that interact coherently with the physical world, as described below with reference to FIG. 5. In other implementations the copies of the quantum state can be produced by an analog quantum simulator or gate-based quantum computer. In other implementations the copies of the quantum state can be generated by evolving initial quantum states under a target process, e.g., an evolution operator.

The system loads the multiple copies of the quantum state in the quantum memory into a quantum computer (step 404). In some implementations the system processes the multiple copies of the quantum state using the quantum computer to obtain a purified quantum state (step 406). The purified quantum state is a quantum state that represents the multiple copies of the quantum state. To process the multiple copies of the quantum state and obtain a purified quantum state the system can perform a linear distillation technique to purify the multiple copies of the quantum state, e.g., perform quantum state distillation, virtual state distillation or a quantum principle component analysis algorithm.

The system uses the quantum computer to measure the purified quantum state. The measured purified quantum state is used to determine, through classical or quantum computation, properties of a target system or properties of a target process (step 408). For example, in some implementations the system can provide measurement results to a quantum machine learning system to learn the properties of the target system or target process.

Figure 5:
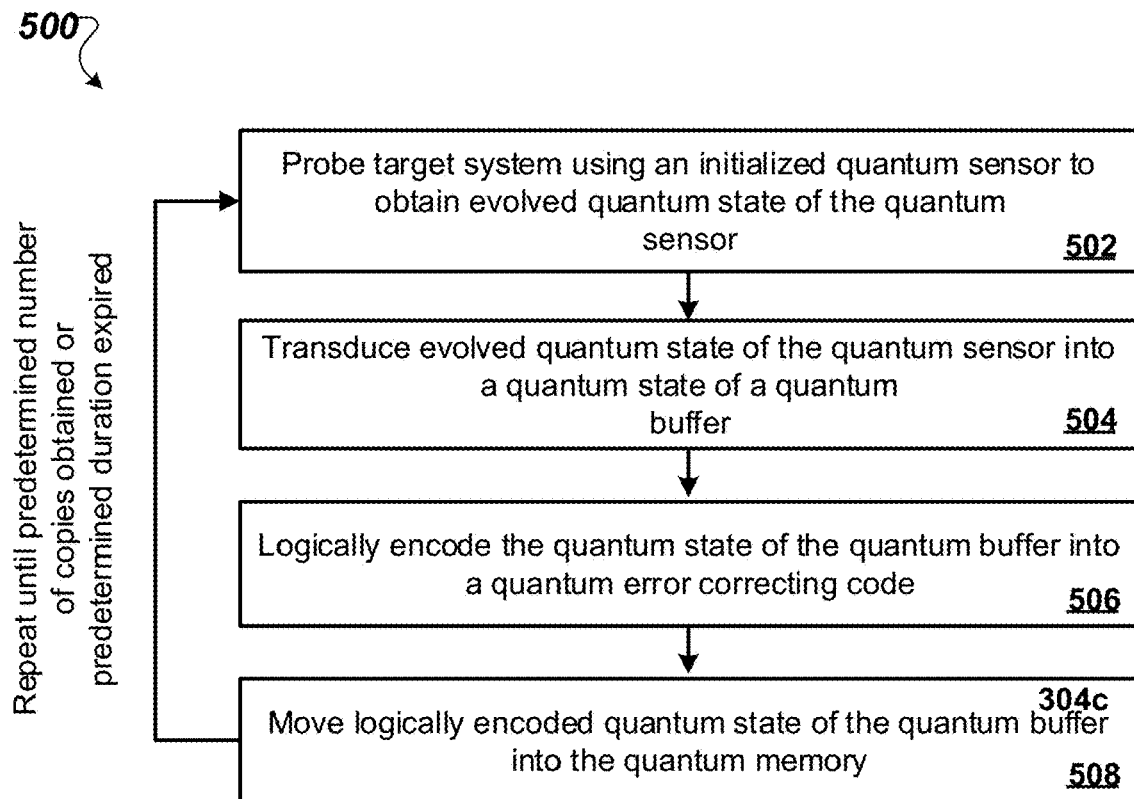
FIGS. 5 and 6 are flow charts of an example process for storing multiple copies of a quantum state in a quantum memory.

FIG. 5 is a flow diagram of a first example process 500 for storing multiple copies of a quantum state in a quantum memory. Example process 500 can be used to perform step 402 of example process 400 described above, e.g., when example process 400 is used to learn properties of physical states or systems. For convenience, the process 500 will be described as being performed by a quantum data processing system. For example, the quantum data processing system 200 of FIG. 2, appropriately programmed in accordance with this specification, can perform the process 500.

To store one copy of the quantum state in the quantum memory, the system probes the target system using a quantum sensor (initialized in an initial quantum state) to obtain an evolved quantum state of the quantum sensor (step 502). The evolved quantum state of the quantum sensor encodes properties of the target system at the time of the probing and can be a state of multiple qubits or a state of bosonic or photonic modes, as described above with reference to FIG. 2. In some implementations the system can probe the target system with finite signal to noise ratio.

The system then transfers information encoded in the evolved quantum state of the quantum sensor to a quantum state of a quantum buffer. In some implementations the quantum sensor and the quantum buffer can include different computational media. For example, the quantum sensor can include a first computational medium and the quantum buffer can include a second computational medium, where the second computational medium is different to the first computational medium. Therefore, to transfer the information encoded in the evolved quantum state of the quantum sensor to the state of the quantum buffer, the system transduces the evolved quantum state of the quantum sensor into a quantum state of a quantum buffer (step 504).

The system then logically encodes the quantum state of the quantum buffer into a quantum error correcting code (step 506). For example, the system can apply a unitary encoding quantum circuit to the quantum state of the quantum buffer or perform a state injection technique. In some implementations the quantum error correcting code distance can dependent on at least one of: operations performed by a quantum computer to obtain a extracted quantum state, as described below with reference to step 306, or an expected duration required to store the multiple copies of the quantum state in the quantum memory.

In some implementations the system moves the logically encoded quantum state of the quantum buffer into the quantum memory (step 508). The system can move the logically encoded quantum state of the quantum buffer into the quantum memory in cases where the quantum buffer encoding is different to the quantum memory encoding. For example, of a lot of copies of the quantum state are required and qubits are sparse, a higher code rate in the quantum memory and a quick encoding in the buffer might be beneficial. In other implementations the quantum buffer and the quantum memory can be a same device, and therefore the logically encoded quantum state would not need to be moved into the quantum memory.

The steps 502-508 are repeated until a predetermined number of copies of the quantum state are stored in the quantum memory or until a predetermined duration expires, e.g., in cases where the target system is a transient system and there is a limited time interval for which the target system can be probed. An example transient system includes a chemical that decomposes in a short amount of time. For example, in some chemical systems, e.g., when imaging or examining dyes, photobleaching (destroying the dye via interaction with light) can occur on short timescales<100 ms and if the process to make the dye is unknown, there are limited measurement opportunities. Another example transient system includes a rare sensing event, e.g., detection of cosmic rays, that does not occur evert often, e.g., once every second.

Figure 6:
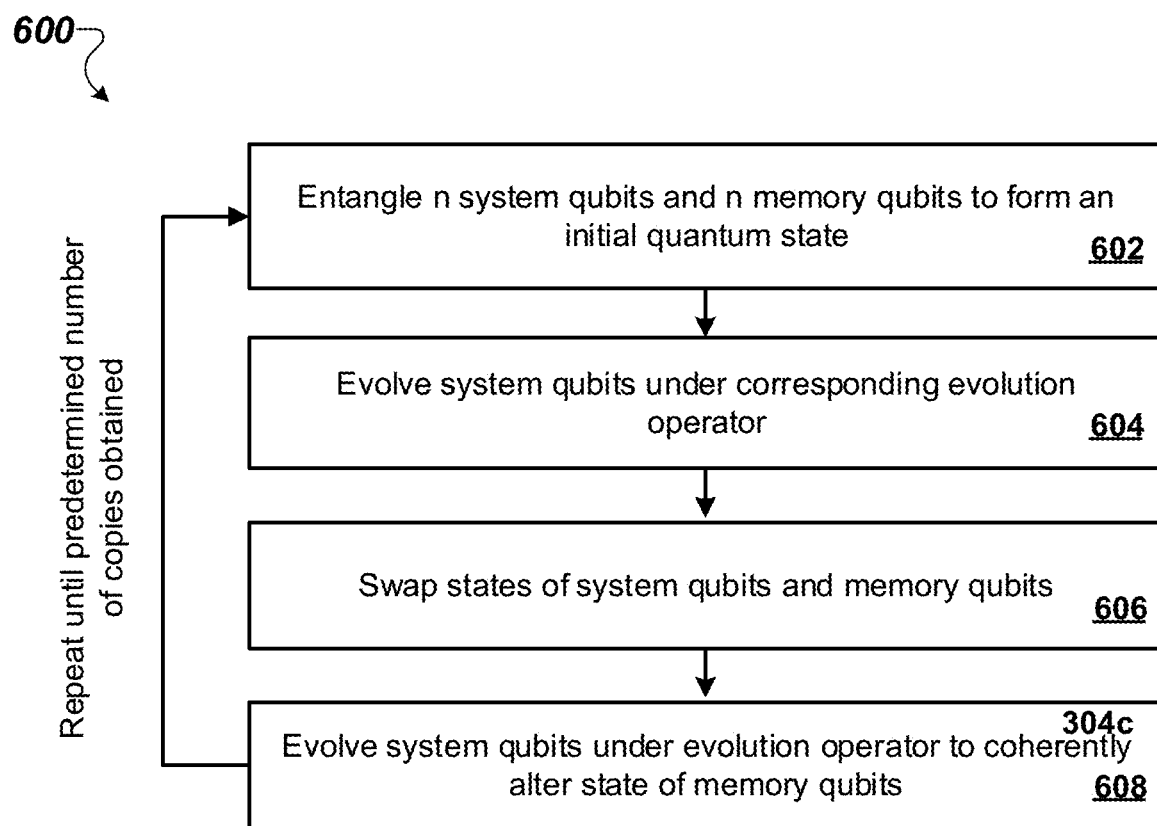

FIG. 6 is a flow diagram of a second example process 600 for storing multiple copies of a quantum state in a quantum memory. Example process 600 can be used to perform step 402 of example process 400 described above, e.g., when example process 400 is used to learn properties of physical dynamics/processes. For convenience, the process 600 will be described as being performed by a quantum data processing system. For example, the quantum data processing system 200 of FIG. 2, appropriately programmed in accordance with this specification, can perform the process 600.

To store one copy of the quantum state in the quantum memory, the system prepares an initial quantum state in which n system qubits are entangled with n memory qubits included in the quantum memory (step 602). The system evolves the system qubits under an evolution operator that corresponds to the physical dynamics/process to be learned (step 604). The system swaps the system and memory qubits (e.g., through application of a quantum circuit that includes multiple swap gates, each swap gate being configured to swap the states of the two qubits on which the gate operates) (step 606). The system then evolves the system qubits under the evolution operator again (step 608).

The process 602-608 causes the evolution operator to coherently alter the state of the n memory qubits, such that the quantum state of the n memory qubits corresponds to a quantum state that has evolved under the evolution operator. The steps 602-608 are repeated until a predetermined number of copies of the quantum state are stored in the quantum memory.

The systems and processes described above with reference to FIGS. 1-6 can be applied to different learning tasks and quantum-enhanced experiments, as described in more detail below.

Example Learning Tasks and Associated Quantum-Enhanced Experiments: Learning Quantum States One example learning task that can be performed using the presently described techniques is learning properties of a physical system that is described by an n-qubit state $\rho$. In this example, each experiment (e.g., sensor interaction or other state preparation method as described above with reference to FIGS. 1 and 2) generates one copy of $\rho$. In a conventional setting, each copy of $\rho$ is measured to obtain classical data. In the presently described quantum-enhanced setting, a quantum computer stores each copy of $\rho$ in a quantum memory, and acts jointly on multiple copies of $\rho$. In both scenarios, it is required that all quantum data is measured at the end of the learning phase of the procedure, so that only classical data remains. After the learning is completed, the learner is asked to provide an accurate prediction for the expectation value of an observable (i.e. a physical quantity) drawn from a set $\{O_1, O_2, \ldots ,\}$, where the number of observables in the set is exponentially large in n. The observables in the set can be incompatible, e.g., each observable may fail to commute with many others in the set.

The quantum advantage achieved by the presently described techniques when applied to this example can be summarized as follows. There exists a distribution over n-qubit states and a set of observables such that in the conventional scenario, at least order 2n experiments are needed to predict the absolute value of one observable selected from the set, while a constant number of experiments suffice in the presently described quantum-enhanced scenario.

The exponential quantum advantage can occur even if the state $\rho$ is unentangled. For example, in some experiments $\rho \propto (I+\alpha P)$ where P is an n-qubit Pauli operator and $\alpha \in (-1, 1)$. This state can be realized as a probabilistic ensemble of product states, each of which is an eigenstate of P with eigenvalue $\alpha$. Even if the state is known to be of this form, but P, $\alpha$ are unknown, the exponential separation between conventional and quantum-enhanced experiments persists. Moreover, the quantum advantage can be achieved by performing simple entangling measurements on pairs of copies of $\rho$. That the quantum advantage applies even when correlations among the n qubits are classical indicates that the quantum-enhanced strategy is beneficial in a broad class of sensing applications.

Figure 7:
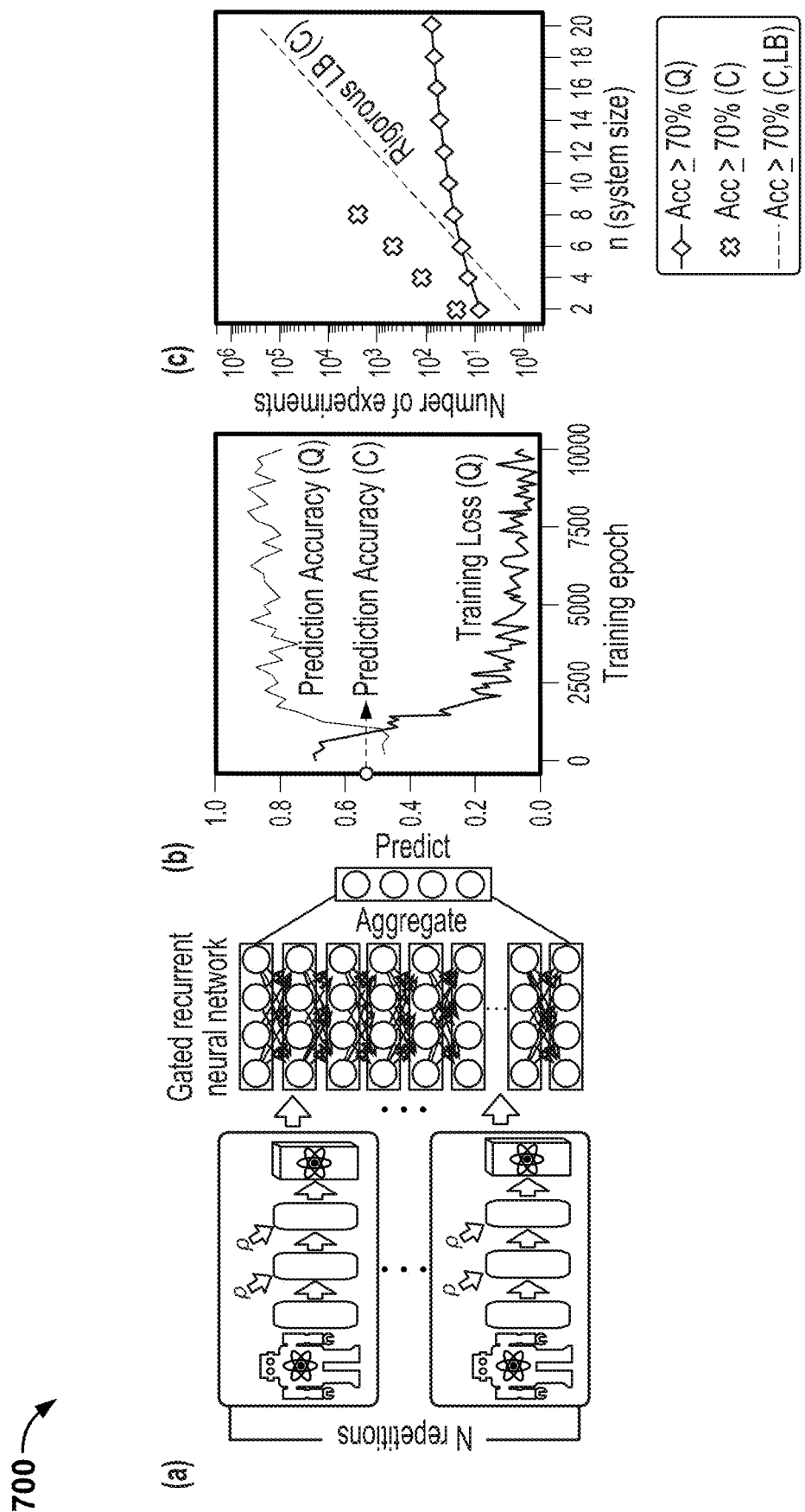
FIG. 7 is an illustration that shows the quantum advantage achieved using the presently described techniques to learn physical states.

FIG. 7 is an illustration 700 that shows a quantum advantage achieved using the presently described techniques to learn a physical state. In particular, the illustration shows results that correspond to the task of estimating the magnitude for the expectation value of Pauli observables with respect to a physical state. In this example, the physical state is an unentangled n-qubit state $\rho = 2^{-n}(I+\alpha P)$, where $\alpha = \pm 0.95$, P is a Pauli operator, and both $\alpha$, are unknown. After all measurements are completed and learning is terminated, two distinct Pauli operators $Q_1$ and $Q_2$ are announced, one of which is P and the other of which is not equal to P. The machine is configured to determine which of $|tr(Q_1\rho)|$ and $|tr(Q_2\rho)|$ is larger.

Part (a) of the illustration 700 shows that N repetitions of quantum-enhanced experiments are performed and corresponding data is fed into a supervised machine learning model, e.g., a gated recurrent neural network (GRU), to make a prediction. In the conventional scenario, where copies of $\rho$ are measured one by one, the best known strategy is to use randomized Clifford measurements requiring an exponential number of copies to achieve the task with reasonable success probability. In the presently described quantum-enhanced scenario, copies of $\rho$ can be deposited in quantum memory two at a time, and a Bell measurement across the two copies can be performed to extract a snapshot of the state.

The supervised ML model is trained to determine which of two n-qubit Pauli operators has a larger magnitude for the expectation value in an unknown state $\rho$. In this example, cross entropy is used as a training loss. In some implementations the neural network can be trained using noiseless simulation data for small system sizes (n<8). The neural network can then be used to make predictions when provided with experimental data for large system sizes (8≤n≤20). The probability to predict correctly is used as the prediction accuracy. Random guessing yields a prediction accuracy of 0.5. The graph shown at part (b) of the illustration 600 shows the performance of the ML model as the neural network is trained.

The graph shown in part (c) of the illustration 700 shows the quantum advantage in the number of experiments needed to achieve ≥70% prediction accuracy (as a function of system size n). Here, (Q) corresponds to results running the supervised ML model based on quantum-enhanced experiments and (C) corresponds to results running the best known conventional strategy. The dotted line is a proven lower bound for any conventional strategy (C, LB). Even running on a noisy quantum processor, the presently described quantum-enhanced experiments are seen to vastly outperform the best theoretically achievable conventional results (C, LB).

Example Learning Tasks and Associated Quantum-Enhanced Experiments: Quantum Principal Component Analysis Another example learning task that can achieve a quantum advantage when implementing the presently described techniques is quantum principal component analysis (PCA). In this task, each experiment produces one copy of ρ, and the goal is to predict properties of the (first) principal component of ρ, namely the eigenstate |ψ⟩ of ρ with the largest eigenvalue. For example, the expectation values of a few observables in the state |ψ⟩ may need to be predicted. This task can become valuable in future quantum-sensing applications. If an imperfect quantum sensor transduces a detected quantum state into quantum memory, the state is likely to be corrupted by noise. But it is reasonable to expect that properties of the principal component are relatively robust with respect to noise, and therefore highly informative about the uncorrupted state.

The quantum advantage achieved by the presently described techniques when applied to this example can be summarized as follows. In the conventional scenario, at least order $2^{n/2}$ experiments are needed to learn a fixed property of the principal component of an unknown n-qubit quantum state, while a constant number of experiments suffice in the quantum-enhanced scenario.

Example Learning Tasks and Associated Quantum-Enhanced Experiments: Learning Quantum Dynamics Another example learning task that can be performed using the presently described techniques is learning properties of physical processes rather than physical states. In these examples, each experiment implements a physical process $\mathcal{E}$. The physical process $\mathcal{E}$ is interfaced with through a quantum machine in the quantum-enhanced setting and a classical machine in the conventional setting (as described above with reference to FIG. 1).

In these examples, a quantum machine can learn an approximate model of any polynomial-time quantum process $\mathcal{E}$ from only a polynomial number of experiments. Given a distribution on input states, the approximate model can predict the output state from $\mathcal{E}$ accurately on average. In contrast, an exponential number of experiments would be needed to achieve the same task in the conventional setting. That is, the quantum advantage achieved by the presently described techniques when applied to this example can be summarized as follows. Consider a polynomial-time physical process $\mathcal{E}$ acting on n qubits and a probability distribution over n-qubit input states. In the conventional scenario, at least order $2^n$ experiments are needed to learn an approximate model of $\mathcal{E}$ that predicts output states accurately on average, while a polynomial number of experiments suffice in the quantum-enhanced scenario.

Figure 8:
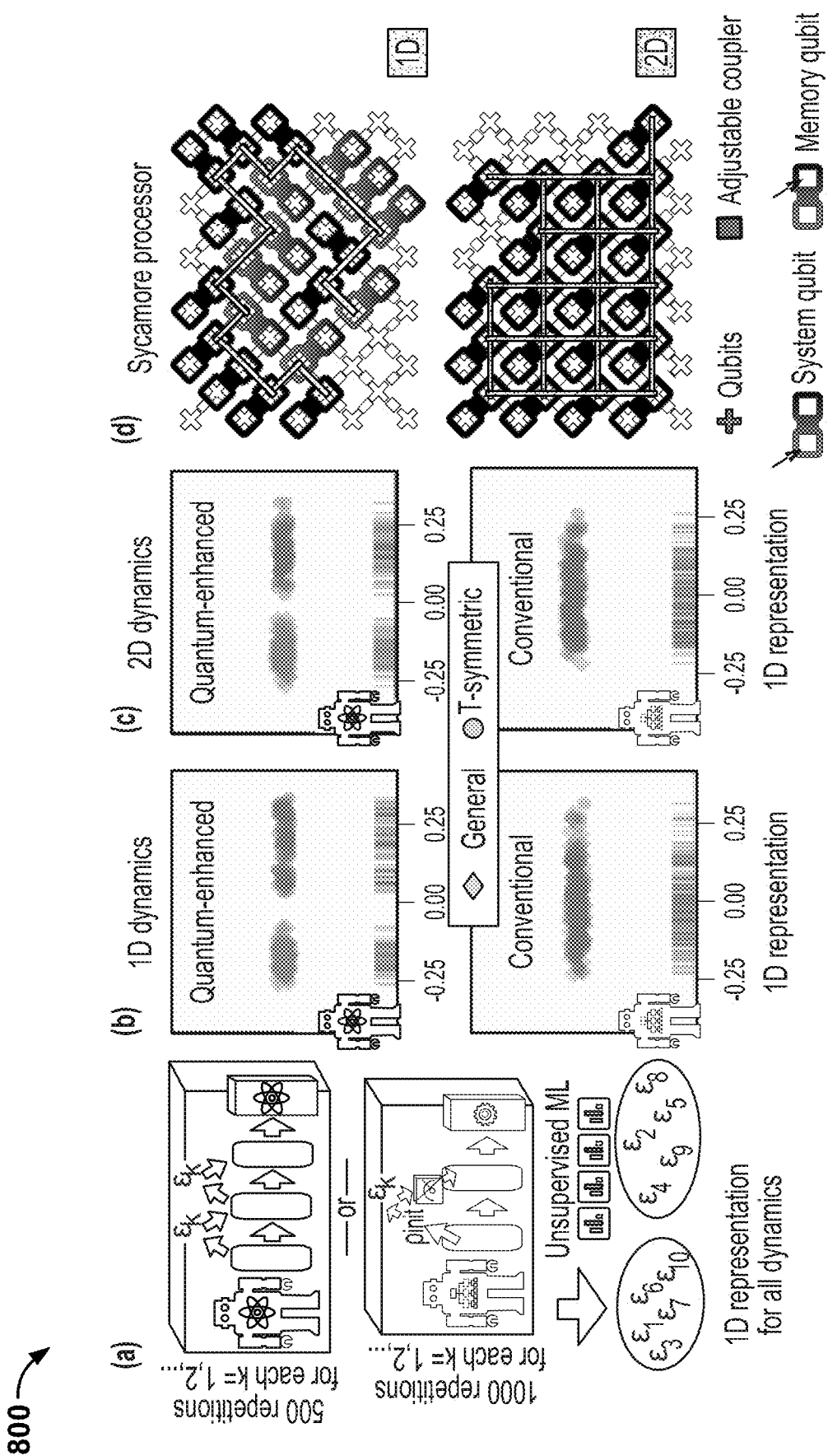
FIG. 8 is an illustration that shows the quantum advantage achieved using the presently described techniques to learn physical dynamics.

FIG. 8 is an illustration 800 that shows the quantum advantage achieved using the presently described techniques to learn physical processes. In particular, the illustration shows results that correspond to the task of using an unsupervised ML to learn to recognize the symmetry class of the unknown evolution operator (where the unknown evolution operator is drawn from either the class of all unitary transformations or from the class of time-reversal-symmetric unitary transformations (i.e., real orthogonal transformations).

In the conventional scenario, the unknown evolution operator is repeated applied to an initial state $|0\rangle^{\otimes n}$, and each qubit of the output state is measured in the Y-basis. Under T-symmetric evolution the output state has purely real amplitudes; hence the expectation value of any purely imaginary observable, such as the Pauli-Y operator, is always zero. In contrast, the expectation value of Y after general unitary evolution is generically nonzero, but may be exponentially small and hence hard to distinguish from zero. In the quantum-enhanced scenario, n additional memory qubits are used. An initial state is prepared in which the n system qubits are entangled with the n memory qubits. The system qubits are evolved under the unknown evolution operator. The system and memory qubits are swapped, and the system qubits are evolved again. n Bell measurements are then performed, each acting on one system qubit and one memory qubit.

As shown in part (a) of the illustration 800, multiple, e.g., 500, repetitions of quantum-enhanced experiments (each accessing $\mathcal{E}_k$ twice) can be performed for every physical process $\mathcal{E}_k$. The data is fed into an unsupervised ML model to learn a one-dimensional representation for describing the distinct physical dynamics $\mathcal{E}_1, \mathcal{E}_2, \ldots$. Alternatively, unsupervised ML can be applied to data obtained from 1000 repetitions of the best known conventional experiments (each accessing $\mathcal{E}_k$ once) for every physical process $\mathcal{E}_k$.

Each evolution operator is a one-dimensional or two-dimensional n-qubit quantum circuit as shown in part (d) of illustration 800. After sampling many different evolution operators from both symmetry classes (and obtaining data from each sampled evolution multiple times), the unsupervised ML model is used to find a one dimensional representation of the evolution operators. The representations learned by the unsupervised ML model are shown in parts (b) and (c) of illustration 800.

Part (b) of the illustration shows a representation learned by unsupervised ML for 1D dynamics. Each point corresponds to a distinct physical process $\mathcal{E}_k$. The vertical line at the bottom shows the exact 1D representation of each $\mathcal{E}_k$. Half of the processes satisfy time-reversal symmetry (diamonds) while the other half of them do not (circles). Part (c) of the illustration shows a similar representation learned by unsupervised ML for 2D dynamics. Parts (b) and (c) of illustration 800 show that using the quantum-enhanced data, the ML model discovers a clean separation between the two symmetry classes (in the quantum enhanced case, the general symmetry class results appear in the left hand side of the graph whereas the results from the T symmetric class is separate and appear only in the right hand side). There is no discernable separation into classes when using data from conventional experiments (results from the general and T symmetric classes are mixed together, there is no visible separation). The signal from the quantum-enhanced experiments is strong enough that the two classes are easily recognized without access to any labeled training data. Part (d) of the illustration shows two example classes of connectivity geometry for implementing the 1D (top) and 2D (bottom) dynamics.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g., photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A computer implemented method comprising:
  storing, in a quantum memory, multiple copies of a quantum state, comprising, for each copy of the quantum state, i) probing, by an initialized quantum sensor, a target system to obtain an evolved quantum state of the quantum sensor, ii) transducing the evolved quantum state of the quantum sensor into a quantum state of a quantum buffer, iii) logically encoding the quantum state of the quantum buffer into a quantum error correcting code, and iv) moving the logically encoded quantum state of the quantum buffer into the quantum memory;

loading the multiple copies of the quantum state in the quantum memory into a quantum computer;

processing, by the quantum computer, the multiple copies of the quantum state to obtain a purified quantum state; and measuring the purified quantum state to determine properties of the target system.

2. The method of claim 1, wherein the quantum sensor is configured to maintain quantum coherence.

3. The method of claim 1, wherein the evolved quantum state of the quantum sensor encodes properties of the target system at the time of the probing.

4. The method of claim 1, wherein the evolved quantum state of the quantum sensor comprises a state of multiple qubits or a state of bosonic or photonic modes.

5. The method of claim 1, wherein probing the target system to obtain the evolved quantum state of the quantum sensor is performed with finite signal to noise ratio.

6. The method of claim 1, wherein the quantum sensor is configured to implement full or partial quantum error correction on the evolved quantum state of the quantum sensor.

7. The method of claim 1, wherein the quantum sensor comprises a first computational medium and the quantum buffer comprises a second computational medium, wherein the second computational medium is different to the first computational medium.

8. The method of claim 1, wherein logically encoding the quantum state of the quantum buffer into a quantum error correcting code comprises applying a unitary encoding quantum circuit to the quantum state of the quantum buffer or performing a state injection technique.

9. The method of claim 1, wherein the quantum error correcting code comprises a code distance that is dependent on at least one of: operations performed by the quantum computer to obtain the purified quantum state or an expected duration required to store the multiple copies of the quantum state.

10. The method of claim 1, wherein the quantum error correcting code is the quantum buffer.

11. The method of claim 1, wherein processing the multiple copies of the quantum state to obtain a purified quantum state comprises performing a linear distillation technique to purify the multiple copies of the quantum state.

12. The method of claim 11, wherein the linear distillation technique comprises quantum state distillation, virtual state distillation or a quantum principle component analysis algorithm.

13. The method of claim 1, wherein measuring the purified quantum state to determine properties of the target system comprises providing measurement results to a quantum machine learning system to learn the properties of the target system.

14. The method of claim 1, wherein the target system comprises a transient target system.

15. A quantum data processing system comprising a quantum sensor, a quantum buffer, a quantum memory, and a quantum computing device, wherein the quantum data processing system is configured to perform operations comprising:

storing, in the quantum memory, multiple copies of a quantum state, comprising, for each copy of the quantum state, i) probing, by the quantum sensor, a target system to obtain an evolved quantum state of the quantum sensor, ii) transducing the evolved quantum state of the quantum sensor into a quantum state of the quantum buffer, iii) logically encoding the quantum state of the quantum buffer into a quantum error correcting code, and iv) moving the logically encoded quantum state of the quantum buffer into the quantum memory;

loading the multiple copies of the quantum state in the quantum memory into the quantum computer;

processing, by the quantum computer, the multiple copies of the quantum state to obtain a purified quantum state; and measuring, by the quantum computer, the purified quantum state to determine properties of the target system.

16. The quantum data processing system of claim 15, wherein the quantum sensor is configured to maintain quantum coherence.

17. The quantum data processing system of claim 15, wherein the evolved quantum state of the quantum sensor encodes properties of the target system at the time of the probing.

18. The quantum data processing system of claim 15, wherein the evolved quantum state of the quantum sensor comprises a state of multiple qubits or a state of bosonic or photonic modes.

19. The quantum data processing system of claim 15, wherein the quantum sensor is configured to probe the target system to evolve the quantum state of the quantum sensor with finite signal to noise ratio.

20. The quantum data processing system of claim 15, wherein the quantum sensor is configured to implement full or partial quantum error correction on the evolved quantum state of the quantum sensor.

21. The quantum data processing system of claim 15, wherein the quantum sensor comprises a first computational medium and the quantum buffer comprises a second computational medium, wherein the second computational medium is different to the first computational medium.

22. The quantum data processing system of claim 15, wherein the quantum data processing system is configured to logically encode the quantum state of the quantum buffer into a quantum error correcting code through application of a unitary encoding quantum circuit to the quantum state of the quantum buffer or through performance of a state injection technique.

23. The quantum data processing system of claim 15, wherein the quantum error correcting code comprises a code distance that is dependent on at least one of: operations performed by the quantum computer to obtain the purified quantum state or an expected duration required to store the multiple copies of the quantum state.

24. The quantum data processing system of claim 15, wherein the quantum error correcting code is the quantum buffer.

25. The quantum data processing system of claim 15, wherein the quantum computing device is configured to process the multiple copies of the quantum state to obtain a purified quantum state by performing a linear distillation technique to purify the multiple copies of the quantum state.

26. The quantum data processing system of claim 25, wherein the linear distillation technique comprises quantum state distillation, virtual state distillation or a quantum principle component analysis algorithm.

27. The quantum data processing system of claim 15, wherein the quantum computing device is configured to provide measurement results obtained by measuring the purified quantum state to a quantum machine learning system to learn the properties of the target system.

28. The quantum data processing system of claim 15, wherein the target system comprises a transient target system.

* * * * *